3,402,056
METHYL CELLULOSE AS STARCH SUBSTITUTE
John W. Ehrmantraus, Midland, Mich., assignor to The Dow Chemical Company, Midland, Mich., a corporation of Delaware
No Drawing. Continuation-in-part of application Ser. No. 502,415, Oct. 22, 1965. This application Oct. 18, 1967, Ser. No. 676,026
4 Claims. (Cl. 106—170)

ABSTRACT OF THE DISCLOSURE

As a substitute for starch to be employed as a gas propelled spray from a pressurized can, a water dispersion of a methyl ether of cellulose of standard viscosity from 5 to 25 centipoises and, thermal gelation temperature in water not above 100° C., together with a foam breaking agent and, optionally, other additives.

Relationship to other applications

This application is a continuation-in-part of my copending application Ser. No. 502,415, filed Oct. 22, 1965, and now abandoned.

Background of the invention

It is well known to prepare a thin water dispersion of a hydrated, cooked, "gelatinized" starch, such as corn starch, at from about 1 to about 5 weight percent concentration of starch by weight of total aqueous preparation, and to package the resulting aqueous dispersion in a gas-propelled spray can whereby to spray the dispersion of starch onto a fabric, such as a man's shirt, prior to ironing it. Starch used thus becomes yellow in a relatively short time, and unless the resulting starch-treated article is used promptly, and thereafter laundered, assumes an irregular and unsightly yellow color from the starch.

Furthermore, moist starch has a tendency to "build up," that is to say, to form a difficultly removable deposit on the sole plate of the iron with which a starched article is later ironed smooth as water is dried from the starch preparation during ironing.

Further, starch emulsions are excellent media for the growth of many microorganisms, and it is necessary to use a cooked starch promptly, or else to incorporate some anti-microbial substance in such starch preparation to prevent its deterioration. Further, articles which have been treated with starch and ironed tend to be "stiff" in the sense that if a dry, smooth, ironed surface of such fabric be sharply inflected, it tends to "break" along a line, and there results an undesirable crease or wrinkle which can be removed usually only by re-starching and re-ironing. Moreover, if an undesired crease or wrinkle is accidentally ironed into a starched fabric, its removal is often nearly impossible unless the process is begun all over again with a thorough wetting of the fabric.

In the attempts to avoid some of the disadvantages of of starch, the carboxyalkyl celluloses, represented by carboxymethylcellulose, typically in the form of its sodium salt, have been employed as a substitute for starch. While this product offers various advantages over starch, it has the disadvantage that it undergoes at least incipient pyrolysis and discoloration at temperatures substantially lower than those employed in ironing most fabrics which are starched. In the attempt to deal with this problem, some commercially packaged such products carry on the label a legend advising the user to set the temperature of the iron at one fabric position lower than that at which it would ordinarily be set. Thus, for ironing linen one sets it at "cotton"; for ironing cotton, one sets it at "wool" and so forth. This approach is undesirable in that even when such instructions are followed, scorching can occur easily; moreover, the practice denies the use, on the treated fabric, of the heat necessary to effect a satisfactory ironing of the fabric.

Prior art

Historically, U.S. Patents 1,926,396, 2,021,981 and 2,321,023 are of interest, telling of the development of fluorocarbon propellants, their use under autogenous pressure, and such use when employed as solvents for active materials.

Patent 3,068,120 teaches a pressure can spray of a water solution of the sodium salt of carboxymethylcellulose.

Description of the present invention

According to the present invention, disadvantages of the prior art are overcome and certain advantages are presented, through the use, as a starch substitute, of certain methyl ethers of cellulose, which can have certain substituents other than methyl etherifying groups on the anhydroglucose units of the cellulose polymer structure.

The methyl ethers of cellulose, optionally with other substituents, are well known, being marketed under the trademark "Methocel."

Several properties of a methyl ether of cellulose can be controlled within close tolerances in manufacture, and typically two such properties are specified with respect to each such commercial product. One is the lower limit thermal gelation temperature, and the other is the viscosity in centipoises at room temperature, both being ascertained, for standard reference purposes, as properties of a two weight percent water solution. Identity of substituents is also readily controlled.

The methyl cellulose ethers to be employed according to the present invention are those of which the standard 2 percent aqueous dispersion has an Ubbelohde viscosity in the range of from 5 to 25 centipoises. The concentration to be employed will be adjusted according to the inherent viscosity of the methyl ether of cellulose employed, but typically concentrations in the range of from about 0.1 to about 5 percent of methyl ether of cellulose by weight of total aqueous preparation are satisfactory. When concentrations lower than this are employed, irrespective of the innate viscosity of the ether, the resulting dry deposit after ironing tends to be so light as not to contribute satisfactorily to the "body" or stiffness of the fabric. When a concentration greater than about 5 percent is employed, irrespective of the viscosity of the starting ether, the viscosity of the resulting aqueous dispersion tends to be too great for efficient distribution on and in a fabric, or from a gas-propelled spray can.

It is essential and and critical to the present invention that the employed cellulose ether have, in addition to some methyl etherifying groups, as at least a significant part of its etherifying groups, a lower alkyl group, preferably further methyl, or ethyl, propyl, isopropyl, butyl, isobutyl or tertiary butyl. It may in addition have, and in some cases desirably will have, as part of its etherifying groups, hydroxy lower alkyl groups, such as hydroxyethyl, 2- or 3-hydroxypropyl, or 2-, 3-, or 4-hydroxybutyl groups, or their simple isomers.

While the properties of any chemical substance are the properties of the whole substance, it now appears to the present inventor, in the use of cellulose ethers as spray starch substitute material, that the presence of lower alkyl etherifying groups which are non-ionic in some way acts to render the resulting product less susceptible to scorching than are similar substances with other substituents, notably ionic substituents such as carboxyl and salts of carboxyl. However, when a significant proportion of loweralkyl etherifying groups are present— and the exact proportion can vary—then some proportion of other etherifying groups is permissible. For example, by the presence of hydroxypropyl or hydroxybutyl etherifying groups, the water dispersibility of the resulting substance may be improved over the properties of an otherwise similar substance lacking such groups. Also, the thermal gelation temperatures of cellulose ethers thus substituted are elevated over the corresponding temperatures of substances without such substituents, and this can be advantageous in some spray starch preparations.

All these products contemplated to be used in the present invention are to at least a predominant extent methyl ethers of cellulose and are thus generically referred to, but not chemically strictly limited as, methyl ethers of cellulose.

The methyl ethers of cellulose as here defined possess the here desirable property of thermal gelation. Thus, when a fresh aqueous dispersion is applied to a fabric and the fabric is then ironed, upon being heated by the hot iron, the aqueous dispersion of methyl ether of cellulose tends to "gel" with the result that the fabric behaves nicely under the iron and the smoothing of wrinkles is easily achieved. However, as the treated fabric is further ironed, water tends to be evaporated. When, subsequently, the fabric cools, the gelation that resulted from heating tends to disappear. The resulting dry fabric has a desirable "hand" and "stiffness," but it has little or none of the brittleness characteristic of a starched fabric. As to the thermal gelation temperature of the aqueous methyl ether of cellulose, a property controllable in manufacture, it is not critical what this temperature be so long as it be lower than the boiling temperature of water under atmospheric pressures. The presence of water in the methyl ether dispersion tends to limit temperature rise in the fabric through the moist phase and until the fabric is essentially dry, and it is during this moist phase that the thermal gelation of the methyl cellulose is most desirable. Thus, methyl cellulose ethers of which the thermal gelation temperature is as low as 50° C., or as high as 90° or 95° C., can be employed. Those with lower thermal gelation temperatures will be preferred for fabrics that are usually ironed at lower temperatures.

While the methyl ether of cellulose can be used to treat a fabric as a simple aqueous dispersion, such dispersion is, without more, not adapted to be employed in a spray container. If there is employed a pressurizing agent which is not emulsifiable in the aqueous preparation, the aqueous preparation tends to issue as a small, hard stream not at all adapted to be evenly distributed over an area of fabric. If there is employed a propellant which emulsifies in the aqueous methyl cellulose preparation, without more, the product tends to issue in the form of a "lather" or "foam." Such lather is also difficult to use successfully. To prepare a practical methyl cellulose aerosol spray mixture, it is necessary to use an emulsifiable propellant in some way so that the resulting emulsion breaks almost instantaneously as the gas-propelled mixture issues from the orifice of the spray container. Moreover, any substance added to the total mixture must be colorless, must be no more susceptible of discoloration with ageing than is the methyl cellulose, nor may it induce scorching or other undesirable performance more readily.

There is value for some users of a starch or like product, in production by the employed material of a certain amount of "drag" upon the sole plate of the iron. Some users find that this "drag" subtly changes with changing water content, abundance of employed material, and the like, and serves to indicate various matters to the user, such as the progress of the ironing. For others it enables a more ready smoothing and flattening of the fabric, and for yet others the value appears to be purely esthetic. When it is desired to have a maximum of such "drag," a simple aqueous dispersion of a methyl cellulose within the limits before defined can be prepared, combined with an emulsion breaking substance, and packaged in a container with an emulsifiable propellant. When it is desired to reduce the "drag" of the iron, a lubricant can be added. Known lubricants are satisfactory, such as an emulsion of a polydimethylsiloxane oil, or a light, emulsifiable paraffin oil.

When it is desired to employ a substance such as isobutane or a Freon as propellant by reason of its desirable pressure properties, emulsifiability of the propellant in the aqueous methyl cellulose product can be enhanced by the addition to the aqueous preparation of a modest amount of a glycol ether. One such substance which has given excellent results is the butyl ether of ethylene glycol. Also useful is the ethyl ether of ethylene glycol, or the normal butyl or ethyl ether of diethylene glycol, or a commercially available mixture of glycol ethers which is a mixed isobutyl ether of mixed lower alkanediols, typically propylene glycol and its homologs. These substances tend also to facilitate the even application of the product to fabric by possessing wetting properties different from those of water or water with conventional wetting agents. It is essential and critical in the present invention to avoid, and for all practicable purposes to exclude, substantially dissociated ionic substances from the resulting preparation. The presence of such ionic substances appreciably enhances the thermal discoloration or scorching of fabrics at ironing temperatures.

Description of embodiments preferred and excluded

Example 1: A commercial methyl cellulose of which a 2 percent aqueous solution at 20° C. has an Ubbelohde viscosity of 10 centipoises was employed. 35 grams of this methyl ether of cellulose were mixed with 500 grams of water at between 80 and 90° C. It is well known that the methyl ethers of cellulose are dispersed readily in hot, but not readily in cold, water. When the dispersion was completed, the resulting hot dispersion was diluted and cooled by the addition thereto of 1395 grams of a mixture of water and cracked ice. There was thus obtained a clear aqueous dispersion of methyl cellulose containing slightly more than 0.5 weight percent of the cellulose ether by weight of total aqueous dispersion. To the resulting methyl cellulose dispersion were added 60 grams of 2-butoxyethanol, 4 grams of a commercial foam-breaking colloid consisting essentially of a polyvalent metallic soap, a non-ionic emulsifier, and a hydrocarbon carrier; and 6 grams of a commercial emulsion of a polydimethylsiloxane oil of a molecular weight on the order of $5 \times 10^5$. The resulting dispersion was somewhat less limpid but was yet essentially transparent. Of the resulting preparation there were 2005 grams, and this was divided approximately equally into 5 aerosol cans each of a nominal capacity of 16 ounces. The cans were sealed and charged with 45 grams of isobutane propellant, obtaining a resulting pressure on the order of 40 pounds per square inch gauge at room temperatures: and were then provided with actuators.

Example 2: A man's shirt of white cotton fabric, having been recently laundered and tumble-dried in an artificially heated dryer and generally irregularly wrinkled from this laundering and drying, was spread on an ironing board and upon a surface thus spread and smoothed approximately flat was sprayed an amount of contents of a pressure can prepared according to Example 1 sufficient that the sprayed area appeared generally moist with individual droplets of moist aqueous starch substitute deposit visible here and there. The moistened smoothed surface was then ironed in conventional manner, using a thermostat-controlled electric iron of which the sole plate was heated to a temperature of approximately 230° C. The ironing process was unhurried, and the ironed surfaces became acceptably smoothly flat and of the appearance desired in a well-ironed cotton fabric. No evidence of scorching was seen. Upon completion of the ironing, no visible evidence of the deposit of starch substitute was noticeable; however, when grasped, the fabric manifested a desirable "hand," that is to say, elastic resilience to crushing and the like.

In similar manner, all areas of the shirt were sprayed, at the convenience of the individual doing the ironing, and thereafter ironed to obtain a white shirt of conventional clean, well-ironed appearance.

As a result of this process, there accumulated on the sole plate of the iron a small amount of a white deposit. It did not char, and if any of the deposit exchanged with substances in or on the shirt, the results were invisible.

The iron was permitted to cool to approximately room temperature, and thereafter wiped with a moist paper towel, and it was observed that the deposit was removed quickly and easily and with very little effort.

Example 3: Three men's white shirts are prepared in the manner described in Example 2. One of them is conventionally folded, by buttoning the top button, turning the shirt face down, folding the sleeves so that the cuffs come up to the yoke, infolding the sides to narrow the dimensions of the shirt, and folding the tail twice over toward the yoke, to obtain an essentially rectangular shirt folded over a cardboard stiffener in the manner conventionally employed in the sale of new shirts and in the presentation of professionally laundered shirts. Essentially simultaneously, another shirt essentially identical except that instead of the starch substitute of the present invention, there is employed corn starch in its finishing, is similarly folded. Both shirts, first overwrapped with plastic sheeting, are placed side by side in a dresser drawer and both are loaded by placing on top of each 5 essentially identical shirts. They are permitted to remain in this condition for a day, and thereafter removed, the overwrap of plastic removed, and the shirts unfolded. The shirt described as being finished with starch shows well defined creases along the line of each fold; the shirt described as being prepared with the composition of the present invention shows such creases initially but upon a few moments hanging on a clothes hanger loses such creases and presents essentially a smooth, well-ironed finish.

The second of the three shirts described as being prepared in the manner of the foregoing example, and an essentially identical shirt that is finished with the use of corn starch, after being ironed, are hung side by side in a clothes closet on hangers. They are permitted to remain in this condition for 6 months, and thereafter inspected. The shirt finished with corn starch has turned distinctly yellow. The shirt finished with the composition of Example 1 remains white.

The third shirt described as being prepared according to the present invention is immediately placed into service and worn, being worn deliberately until conspicuously dirty on the cuffs and inside the collar. A man's white cotton shirt of essentially identical fabric finished without the product of the present invention is similarly worn to approximately the same degree of soil.

Both soiled shirts are simultaneously laundered in the same batch in an automatic washing machine, centrifuged together to reduce moisture content, and dried together in an artificially heated tumble dryer. The shirts are then inspected. The shirt ironed with the air of the methyl cellulose dispersion of the present invention before soiling is for all practical purposes completely clean. Visible stains remain inside the cuff and inside the collar of the shirt of which the finishing omits the present aqueous dispersion. The function of the starch substitute of the present invention as a soil release agent is thus established.

Example 4: In the present example, the cellulose ether was predominately methoxy substituted, to the extent of 28 to 30 percent of the available substitutable sites, but contained in addition between 7 and 12 percent hydroxypropoxy substituents. A 2 percent aqueous solution of the resulting ether manifested a thermal gelation temperature of approximately 60° C., and had an Ubbelohde viscosity of 5 centipoises. Two grams of the cellulose ether were dispersed in 25 milliliters hot water, and diluted to 100 milliliters by the addition of cold water to obtain a room-temperature aqueous dispersion of the said cellulose ether. The resulting aqueous dispersion was modified by the addition thereto of 0.3 gram of a commercial lubricant emulsion of a high molecular weight polydimethylsiloxane, 0.2 gram of a commercial foam-breaking colloid consisting essentially of a polyvalent metallic soap, non-ionic emulsifier, and hydrocarbon carrier; and the resulting dispersion was further modified by the addition to it of 3 grams of 2-butoxyethanol.

The resulting essentially clear aqueous dispersion was positioned in a 6 ounce aerosol can, sealed, and pressurized by the injection of 11.5 grams of isobutane propellant.

Example 5: 7 grams Methocel MC400 methyl cellulose were disposed in 100 grams hot water at between 80 and 90° C., whereupon the Methocel became wetted and formed a viscous solution. To this was then added 279 grams cold water. To the resulting solution was then added 12 grams 2-butoxyethanol, 0.8 gram of a commercial foam-breaking colloid consisting essentially of a polyvalent metallic soap, a nonionic emulsifier and a hydrocarbon carrier; and 1.2 grams of a commercial emulsion of a polydimethylsiloxane oil of a molecular weight on the order of $5 \times 10^5$.

As a result of these procedures there was obtained a milky, viscous, opaque fluid product, a total of, to a rough approximation, 400 grams.

The product was then disposed in a gas-propelled spray can, which carried an eduction tube and valve mechanism; on a vacuum line under about 15 pounds pressure per square inch absolute a substantial part of contents of air was removed from the capped can, and thereafter the can was charged with isobutane in sufficient amount to produce a pressure of about 50 pounds per square inch gauge within the can.

The pressure canned product containing the preparation made with Methocel MC400 was compared with a preparation otherwise essentially identical but based upon a methyl cellulose of which a 2 weight percent aqueous solution at 20° C. has an Ubbelohde viscosity of 10 centipoises, known commercially as Methocel MC10, said product being exactly a product of Example 1.

In particular, products from each of the cans were sprayed on to a cotton laboratory towel, in a manner representative of household use of a spray starch.

The product based upon Methocel MC10 issued from the spray actuator as a fine mist in a broad, uniform cone, was readily and uniformly disposed over the cloth, and quickly penetrated it, leaving the fabric appearing uniformly moist.

The product based upon Methocel MC400 issued from the spray actuator as heavy, almost particulate, irregular masses: manifested little tendency to break as a cone, and reaching the fabric as heavy, viscous, white deposits, not suitably covering the entire fabric. When enough was applied to cover the whole surface of the fabric, the resulting foam expanded to a total depth of about one half to three quarter inch, completely hiding the fabric. The expansion was imputed to the vaporization of emulsified or otherwise entrapped isobutane. The foam deposits remained intact for an extended period of time, longer than the observation period.

The product based upon Methocel MC400 was judged to be unsuited to be used as a fabric treatment applied in the manner herein described; one using it would have to apply a hot iron to a conspicuous deposit of relatively stable foam. No practice of domestic treatment of fabrics, and in particular no practice of starching, sizing, or the like is believed to accept such practice.

Example 6: Tests were carried out on fabric with no treatment, fabric sprayed according to package directions with "Magic Finish" a commercial spray starch substitute product of Armour & Co., Inc. and fabric sprayed with a preferred embodiment of this invention.

A sample of the said "Magic Finish" as commercially sold, was analyzed and found to contain 1.90 percent of the sodium salt of carboxymethylcellulose, 0.10 percent of a silicone containing recurring hydroxy-alkoxy moieties along a siloxane structure (a "glycol silicone") and 0.03 percent of a polyethylene glycol of average molecular weight approximately 200. In this formula, the sole sizing component was the sodium salt of carboxymethylcellulose.

Fabric was sprayed with "Magic Finish" according to package directions.

Another fabric sample was similarly treated with a product of the present invention of which the composition, exclusive of water and propellant, as weight percent of non-propellant spray can contents was 1.75 percent methyl cellulose of which the 2 weight percent aqueous solution has a viscosity of 10 centipoises ("Methocel MC10"), 0.30 percent of polydimethylsiloxane emulsion ("Dow Corning EF–1–1034 emulsion"), 0.20 percent of a foam breaking colloid consisting essentially of a polyvalent metallic soap, a nonionic emulsifier and a hydrocarbon carrier; and 3 percent of the monobutyl ether of ethylene glycol, a preferred embodiment of this invention in which the sole sizing component was the said methyl ether of cellulose.

All samples were treated alike except for starch substitute material employed, and all results were read in identical procedures and with the same apparatus, and all tests were replicated and replicate results were averaged, and the difference in results indicate solely the difference in starch substitute material employed.

Scorch results were read by comparing a reflectometer reading from a group of unscorched areas with a group of readings from different parts of an area heated by the presence of a thermostat controlled electric iron set at the temperature needed to iron "linen" and having a surface temperature varying between 250 and 215° C., under its own weight and in position for 60 seconds. In such tests, a higher reflectometer reading indicates less scorching and is therefore more desirable.

When unscorched area readings are converted to the arbitrary value of 100%, and scorched areas converted proportionally, scorched area readings and products with which they were treated were as follows:

| | Percent |
|---|---|
| Control, no treatment | 94 |
| Sodium salt of carboxymethylcellulose ("Magic Finish") | 69 |
| Methyl ether of cellulose (formula hereinabove) | 95.5 |

The label of the commercial product of which the sole sizing component was the sodium salt of carboxymethylcellulose clearly warned users that the thermostat control of an electric iron was to be set one fabric position lower in temperature than was called for on the conventional position plate on the iron. Failure to do so resulted in ready scorching of fabric treated with the sodium carboxymethylcellulose.

Example 7: The phenomenon of scorching of fabric treated with various carbohydrate derivative substances was studied. In particular, water solutions were prepared each containing 1.5 percent of water soluble carbohydrate derivative by weight of total solution, the carbohydrate derivative in one solution being a commercial sodium carboxymethyl cellulose and in the other solution being a methyl ether of cellulose of which the standard 2 weight percent water solution at 20° C. had an Ubbelohde viscosity of ten centipoises: the solutions contained nothing else. They were applied to areas of white cotton fabric and the so-treated areas permitted to evaporate to dryness. The treated areas were then tested for scorching in substantially the manner described in Example 6 except that, upon different treated areas various time intervals of contact with hot iron were employed. It was ascertained that areas treated with sodium carboxymethyl cellulose scorched much more readily than did means treated with methyl cellulose.

After replication of the test with various water soluble carbohydrate derivative polymers it became routine to identify the area treated with sodium carboxymethyl cellulose by the ease with which it developed scorch. It was ascertained also that the tendency to scorch under the heat of the iron was inherently a property of the alkali metal carboxyalkyl cellulose; it was not made significantly better or significantly worse by employment of any additives that were routinely tested in conjunction with the preparation of practical products of this invention. In contrast, methyl cellulose showed less tendency to scorch than did the fabric upon which it was deposited. Its freedom from scorch was not significantly changed by any substances employed as additives.

The resulting composition was tested in the ironing of white cotton fabric and found to be highly satisfactory, essentially indistinguishable from that of Example 1.

In practicing this invention, no substitute for, and no full equivalent of the methylcellulose as defined, is known. This methylcellulose used according to the present invention has, in comparison with alternative substances, these advantages: thermal gelation when wet, and resulting good behavior under the iron; good "hand" in the resulting ironed product with freedom from sharp "break" creasing and ease of eradicating undesired creases accidentally ironed in; excellent usefulness in "touch up" ironing of part of a garment; high resistance to highlight scorching; high stability against yellowing with age in air; inhospitality to degradative microorganisms without need for a preservative; and essentially, freedom from corrosion in metal containers for lack of active metal or hydrogen ions.

As lubricant, none is critical but available substances having properties that are satisfactory in the present invention and lose none of the advantages of this invention include any essentially colorless silicone oil emulsion. A mineral oil can be used but may not be preferred because, at rates giving good lubricity such an oil tends to leave oleophanous areas that appear discolored. Polyglycols can be used as lubricants but care should be exercised in selecting one to avoid any with low scorch temperatures.

As emulsion breaking agents, any of various commercial foamicides can be used, such as Colloid 581B., which comprises a polyvalent metal salt of higher fatty acids, with a hydrocarbon oil; tri-n-butyl phosphate can be used; various oily aliphatic substances are known as emulsion-breaking agents. Various such agents appear in U.S. Patents 1,957,513, 2,425,828, and 2,302,187.

Propellants hardly require discussion. Isobutane, the Freons, fluorocarbons, mixtures of Freons and fluorocarbons and the like can be used. Can pressures of about 40 p.s.i.g. at 20° C. have been satisfactory.

Adding an agent to enhance the temporary dispersibility of propellant in the essentially aqueous preparation may gave a better spray pattern. A monoalkyl ether of a glycol is such an agent, for example 2-butoxyethanol.

I claim:

1. In combination as a composition in a spray container and under pressure of an at least partially and temporarily emulsifiable propellant that, at room temperatures, is typically a rapidly vaporizable liquid, an aqueous dispersion comprising from 0.1 to 5 percent by weight of total aqueous dispersion of a methyl ether of cellulose that is characterized by these properties:

its standard 2 weight percent aqueous dispersion has an Ubbelohde viscosity of from 5 to 25 centipoises and the thermal gelation temperature of its aqueous dispersion is not above 100° C.; and a foam breaking agent, the balance of said composition being essentially water.

2. Composition of claim 1 containing also a lubricant.

3. Composition of claim 1 containing also an agent to enhance the at least temporary emulsification of the propellant.

4. Composition of claim 3 containing also a lubricant.

No references cited.

MORRIS LIEBMAN, *Primary Examiner.*

H. H. FLETCHER, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,402,056                          September 17, 1968

John W. Ehrmantraut

It is certified that error appears in the above identified patent and that said Letters Patent are hereby corrected as shown below:

In the heading to the printed specification, line 3, "John W. Ehrmantraus" should read -- John W. Ehrmantraut --.

Signed and sealed this 10th day of March 1970.

(SEAL)
Attest:

Edward M. Fletcher, Jr.                    WILLIAM E. SCHUYLER, JR.
Attesting Officer                              Commissioner of Patents